Patented Oct. 11, 1938

2,132,847

UNITED STATES PATENT OFFICE 2,132,847

LUBRICATING OIL

Melvin A. Dietrich, Wilmington, Del., assignor to E. I. du Pont de Nemours & Company, Wilmington, Del., a corporation of Delaware No Drawing. Application October 20, 1936, Serial No. 106,516

13 Claims. (Cl. 87—9)

This invention relates to improved lubricating oils, particularly mineral lubricating oils, and processes of preparing the same.

It is now well known that the viscosity of lubricating oils and particularly mineral oils varies greatly with change in temperature. Since the viscosity of the oil is depended upon for thick film lubrication, change in the viscosity presents a serious problem. Theoretically, the more viscous the oil the more effective it is as a thick film lubricant. However, this is true only within limits. An extremely viscous or solid lubricant is undesirable for many purposes and, due to its adhesiveness and cohesion, will prevent the operation of many types of machines. Also, it is desirable to have a fluid lubricant for lubricating parts which cannot be reached by a very viscous or solid lubricant. Some of the ordinary oils or mineral oils freeze or solidify at relatively high temperatures and hence are not effective at such temperatures and some less viscous oils are too thin at relatively low temperatures to be effective lubricants at such temperatures.

Many attempts have been made to improve the properties, particularly the viscosity-temperature relationships, of lubricating oils. It has been proposed to add various materials to the lubricating oils for this purpose among which are high molecular weight hydrocarbon materials, e. g., polymerized isobutylene, hydrogenated rubber, unvulcanized rubber and the like. These additions have met with some success, but have thickened the lubricating oils to an undesirable extent.

Rubber is difficultly soluble in mineral oils, requiring heating or soaking for a prolonged period of time, frequently from 5 to 15 hours. Solution of rubber in organic liquids improves its solubility in the oil but the solvent itself is frequently a volatile inflammable liquid and unless subsequently removed imparts undesirable volatility characteristics to the oil. Further, rubber dissolved in the oil directly or with the aid of an outside solvent which is subsequently removed exerts a decided thickening effect and, under the heating conditions to which mineral oil solutions are subjected in service, it tends to break down into products of indeterminate viscosity effect. Rubber, milled to the extent necessary to improve substantially its solubility in mineral oils, is appreciably oxidized and, because of this oxidation, its mineral oil solutions tend to be unstable under service conditions.

An object of the present invention is to improve lubricating oils and particularly the viscosity-temperature relationships of mineral lubricating oils. Another object is to improve mineral lubricating oils by adding rubber thereto, which rubber has been treated to improve its properties. A further object is to provide new and improved mineral lubricating oils and methods for preparing the same. Still further objects will appear hereinafter.

These objects may be accomplished in accordance with my invention which comprises incorporating in lubricating oils, particularly mineral lubricating oils, peptized rubber, i. e., rubber plasticized by means of chemical agents such as unsymmetrically substituted hydrazines, alphanitroso-beta-naphthol, and thio-phenols.

It has been common practice to add to rubber during the milling operation certain materials which assist in softening the rubber. The materials which are most commonly employed are oils, esters, waxes, fats, alcohols, acids, resins and the like which assist in the production of soft rubber either by a swelling action on the rubber or by acting as a lubricant. Some of the most common softeners are mineral oil, pine tar, palm oil, rosin oil, dibutyl phthalate, paraffine, glycerine, dodecyl alcohol and stearic acid. These types of compounds are not peptizing agents or plasticizers in the sense employed by me.

Rubber is complex in nature and those skilled in the art are not in entire agreement as to its exact constitution. However, it appears that rubber comprises molecules of high molecular weight which are associated in some manner to produce the rubber gel. In order to influence the plasticity of this rubber gel, it is necessary to modify the associating forces between the molecules in some manner. The peptizing agents or plasticizers employed in accordance with my invention, when added to the rubber, appear to reduce the molecular attraction to such an extent that the gelation is materially decreased and the rubber rendered more plastic. It has not been determined whether or not a small amount of oxygen, which is combined with the rubber in the form of peroxides or in some other form, exerts an important influence. It may be that these points of oxidation serve as points of weakness which permit the gel to be peptized in a manner more or less physically similar to the thinning of a gelatin jelly by means of acid.

The change in the state of the rubber gel induced by my compounds, is not instantaneous but requires more or less time to develop. While a small immediate effect may result, it is, in general, not great enough to be noticeable. However, upon standing for a period of time, the peptizing agents continue to peptize the rubber until the effect is sufficient to be easily detectable by hand testing methods. This plasticizing or peptizing action continues at a decreasing rate until an apparent equilibrium condition is reached, after which little or no further softening takes place. The length of time required to reach this equilibrium varies considerably for different compounds and decreases rapidly as the temperature is increased. A beneficial peptizing action will, in general, be noticed in periods of time which may vary from 15 minutes to two days. Also, the amount of peptizing action which will be obtained over a given period of time will vary with the particular agent and the amount which is employed. However, the increase in effect of increased amounts of agent is not in proportion to the amount of agent added. The amount of agent to be added may be varied within an extremely wide range depending upon the rubber, the other compounding ingredients and the desire of the user. However, for economical reasons, it will generally be found that from .1 to about 5% of the agent will be sufficient for my purposes. It is only the agents which operate in this manner which are useful for my purpose and which are to be included within the scope of my invention and within the scope of the term "peptizing agents".

I have found that, when peptized rubber is added to a lubricating oil, it is much more soluble in the oil and hence can be readily incorporated in the oil at relatively low temperatures with periods of contact as low as 5 minutes. Also, it is possible to incorporate larger amounts of peptized rubber in the oil. Such peptized rubber has a lesser thickening action than unpeptized rubber and has a greater effect on the viscosity-temperature relationships of the oil. The peptized rubber produces a much more stable lubricating oil. The above effects are extremely important advantages over the use of unpeptized rubber.

Preferably, the rubber should be substantially free of the usual compounding ingredients such as sulfur, vulcanization accelerators, zinc oxide, carbon black, fillers and the like and particularly vulcanizing and filling ingredients. The rubber may contain antioxidants but care must be taken to avoid the use of compounds which would destroy the effect of the peptizing agents.

Among the peptizing agents which may be employed in accordance with my invention, the unsymmetrically substituted hydrazine compounds are preferred. These unsymmetrically substituted hydrazine compounds and the preferred modes of employing them for peptizing rubber are disclosed in the Williams and Smith Patents 2,018,643, 2,018,644 and 2,018,645, the application of Ira Williams and Carroll C. Smith Ser. No. 36,324 filed August 15, 1935 and the application of Ira Williams and Carrol C. Smith Ser. No. 40,090 filed September 11, 1935 which issued on January 12, 1937 as Patent No. 2,067,299. Representative compounds disclosed in such patents and applications are phenyl hydrazine, the reaction product of phenyl hydrazine and sulfonyl chloride, the addition product of two mols of phenyl hydrazine and one mol of zinc chloride, the addition product of two mols of phenyl hydrazine and one mol of cadmium chloride and the addition product of two mols of phenyl hydrazine and one mol of lead chloride. The oils containing the peptized rubber prepared in accordance with these patents and applications will generally be preferred because of their outstanding stability and the outstanding solubility of the peptized rubber in the oil.

Another extremely active peptizing agent is alpha-nitroso-b-naphthol which is disclosed in an application of Ira Williams and Carroll Cummings Smith Ser. No. 60,064 filed January 21, 1936. This agent must be employed in the absence of neutralizing agents as the salts of a-nitroso-b-naphthol are apparently ineffective and hence neutralizing agents will inhibit the action of a-nitroso-b-naphthol.

Still other very effective peptizing agents are the aromatic mercaptans or thio-phenols disclosed in the application of Ira Williams and C. C. Smith Ser. No. 63,394 filed February 11, 1936 which issued on December 15, 1936 as Patent No. 2,064,580. These aromatic mercaptans or thio-phenols are aromatic compounds containing a —SH group in which the sulphur is directly bonded to a carbon atom of the benzene ring. One of the most effective of these compounds is thio beta-naphthol. These aromatic mercaptans must be employed in the free state in the absence of neutralizing materials as their salts are apparently ineffective.

The quantities of the peptized rubber added to the oil will be determined by the characteristics desired in the finished products. In general, however, the quantity of the peptized rubber will not exceed 30% and will usually be more than 0.3% of the oil. I prefer to use from 2 to 10% of the rubber on the weight of the oil. Still higher concentrations of the peptized rubber may be employed particularly in the production of materials suitable for use as greases.

In order to more clearly illustrate my invention, the preferred modes of carrying the same into effect and the advantageous results to be obtained thereby, the following example is given:

*Example*

Unvulcanized uncompounded rubber was treated with from 1% to 5% of phenyl hydrazine, thio-beta-naphthol and alpha - nitroso - beta-naphthol until maximum plasticity had been obtained. The amounts of the plasticized rubber, shown in the table below, were dissolved in mineral lubricating oil by heating to 50 to 75° C. and stirring for from 5 to 15 minutes. Improvement in the quality of the oil was measured by determining the viscosity at 100° F. and 210° F. and calculating the viscosity index according to the method published by Dean & Davis in Chem. and Met. Eng. 36,618 (1929). This index serves as a measure of the flatness of the viscosity-temperature curve. With increasing values of the index, viscosity-temperature curves become flatter. The effect of the addition of the rubber on the viscosity-temperature curve of the mineral oil is shown in the following table:

*Table*

| Weight percent of peptized rubber added to oil | Peptizing agent | Saybolt Universal viscosity at— | | Viscosity index |
|---|---|---|---|---|
| | | 100° F. | 210° F. | |
| | | *Sec.* | *Sec.* | |
| Oil No. 1 as received | None | 330 | 53.7 | 95 |
| 2 | Phenylhydrazine | 503 | 69.4 | 115 |
| 5 | do | 972 | 112.5 | 125 |
| 2 | Thio-beta-naphthol | 391 | 60.5 | 112 |
| Oil No. 2 as received | None | 531 | 57 | 47 |
| 2 | Phenylhydrazine | 826 | 71.5 | 68 |
| Oil No. 3 as received | None | 243 | 44.6 | 7 |
| 2 | Phenylhydrazine | 395 | 56.1 | 82 |
| Oil No. 4 as received | None | 329 | 54.2 | 97 |
| 2 | a-Nitroso-b-naphthol | 721 | 78 | 104 |

The peptized rubber containing phenyl hydrazine was prepared by adding 25 grams of unmilled pale crepe rubber cut into fine pieces, to 500 cubic centimeters of benzene, followed by one-fourth gram of phenylhydrazine. After shaking thoroughly, the mixture was allowed to stand for three days at 35–40° C. The benzene was then removed by evaporation under reduced pressure and the red, tacky, plastic mass employed for solution in the oil. The peptized rubber containing the other agents was prepared similarly.

The stability of these solutions under service conditions is shown by the performance of the treated and untreated No. 2 oil in the above table in a single cylinder combustion engine. After 21 hours operation in this engine, the untreated oil had produced 12.7 mg. of sludge per 10 grams of oil while the oil containing the peptized rubber produced only 5.8 mg. of sludge per 10 grams of oil.

While it is preferred to peptize the rubber before adding it to the lubricating oil, it is possible to prepare a lubricant containing peptized rubber by adding the rubber to the mineral oil containing a peptizing agent and permitting the mixture to stand until peptization has been accomplished. This latter method, however, is less effective and offsets one of the main advantages of direct utilization of peptized rubber, namely, easy solubility in the oil.

It will thus be apparent that the present invention permits the production of lubricating oils of high viscosity index and stability from oils with an inferior index and stability through the addition of a rubber so modified as to be easily dissolved in the oil at relatively low temperatures and in a very short time. In order to dissolve ordinary rubber in oils, prolonged exposure at elevated temperatures is necessary which induces oxidation and instability in the oil with resultant sludge formation and breakdown in service. The use of peptized rubber with its easy solubility at low temperatures, avoids this tendency and results in a product with high resistance to oxidation and sludging under conditions of use. The oils treated with peptized rubber show a relatively small amount of thickening when compared with oils containing an equal concentration of ordinary rubber. This characteristic permits the production of lubricating oils with a higher rubber content and consequently possessing an increased tackiness than has heretofore been possible.

While I have disclosed the preferred embodiments of my invention and the preferred modes of carrying the same into effect, it will be readily apparent to those skilled in the art that many variations may be made therein without departing from the spirit thereof. Accordingly, the scope of my invention is to be limited solely by the appended claims construed as broadly as is permissible in view of the prior art.

I claim:

1. A lubricant comprising a lubricating oil having incorporated therein a minor proportion of unvulcanized rubber which has been plasticized by means of a peptizing agent.

2. A lubricant comprising a lubricating oil having incorporated therein a minor proportion of unvulcanized rubber substantially free of the usual compounding ingredients which has been plasticized by means of a peptizing agent.

3. A lubricant comprising a lubricating oil having incorporated therein a minor proportion of unvulcanized rubber substantially free of vulcanizing and filling ingredients which has been plasticized by means of a peptizing agent.

4. A lubricant comprising a lubricating oil having incorporated therein a minor proportion of unvulcanized rubber which has been plasticized by means of a peptizing agent selected from unsymmetrically substituted hydrazine compounds, alpha-nitroso-beta-naphthol and thiophenols.

5. A lubricant comprising a lubricating oil having incorporated therein a minor proportion of unvulcanized rubber which has been plasticized by means of an unsymmetrically substituted hydrazine compound.

6. A lubricant comprising a lubricating oil having incorporated therein a minor proportion of unvulcanized rubber which has been plasticized by means of phenyl hydrazine.

7. A lubricant comprising a lubricating oil having incorporated therein a minor proportion of unvulcanized rubber plasticized by means of a thio-phenol.

8. A lubricant comprising a lubricating oil having incorporated therein a minor proportion of unvulcanized rubber plasticized by means of thio-beta-naphthol.

9. A lubricant comprising a lubricating oil having incorporated therein a minor proportion of unvulcanized rubber plasticized by means of alpha-nitroso-beta-naphthol.

10. A lubricant comprising a lubricating oil having incorporated therein from 0.3% to 30% of unvulcanized rubber plasticized by means of a peptizing agent.

11. A lubricant comprising a lubricating oil having incorporated therein from about 2 to about 10% of unvulcanized rubber plasticized by means of a peptizing agent.

12. A lubricant comprising a lubricating oil having incorporated therein from 0.3% to 30% of unvulcanized rubber substantially free of the usual compounding ingredients which has been plasticized by means of a peptizing agent.

13. A lubricant comprising a lubricating oil having incorporated therein from about 2 to about 10% of unvulcanized rubber substantially free of the usual compounding ingredients which has been plasticized by means of a peptizing agent.

MELVIN A. DIETRICH.